UNITED STATES PATENT OFFICE.

WILLIAM STANLEY COOKSON, OF TAIPING, PERAK, STRAITS SETTLEMENTS, ASSIGNOR TO LULU MITCHELL SMITH, OF MAUNAWAI, HONOLULU, HAWAIIAN ISLANDS.

PROCESS OF MANUFACTURING NEUTRAL COCONUT OIL.

1,407,930. Specification of Letters Patent. Patented Feb. 28, 1922.

No Drawing. Application filed February 25, 1919. Serial No. 279,167.

*To all whom it may concern:*

Be it known that I, WILLIAM STANLEY COOKSON, a subject of the King of Great Britain, a citizen of Straits Settlements, residing at Taiping, in the State of Perak, Straits Settlements, have invented certain new and useful Improvements in Process of Manufacturing Neutral Coconut Oil, of which the following is a specification.

My invention relates to coconut oil, and it consists in the process for producing the same.

An object of my invention is to provide a coconut oil which is neutral, odorless and colorless.

A further object of my invention is to provide a coconut oil which is free from rancidity or fatty acids.

A further object of my invention is to provide a coconut oil of great purity which may be used for medicinal and toilet preparations, as well as for the manufacture of butter substitutes and for edible purposes generally.

A further object of my invention is to provide a process for producing a pure, neutral coconut oil.

Other objects and advantages will appear in the following specification, and the novel features of the invention will be particularly pointed out in the appended claims.

In carrying out my invention I make use of fresh coconut or clean copra as raw material. If fresh coconuts are taken, it is preferable, although not essential, to have them of a certain degree of ripeness, i. e., a stage before the oil content of the coconut has reached its maximum, and before the sugar content has reached its minimum. This stage is reached at about the time when the watery contents of the ripening coconut have been sufficiently reduced in volume to be barely perceptible on shaking. At a later stage the watery contents will shake audibly.

If the fresh coconuts are taken as raw material, the husk of the coconut (epicarp and mesocarp) may be removed or not, as desired. The coconut is opened by splitting, sawing, breaking, or by any other suitable means, and the pericarp is removed. The endosperm (albumen or "white meat") is removed by rasping, scraping, grinding, cutting, breaking, or in any other suitable manner.

Where copra is used as raw material, the process begins with the following steps: The endosperm from the copra, or from the fresh coconut as above described, is reduced to a more or less finely divided state either in the presence of water, such as the water of the coconut, or other water, or else a quantity of water or some similar liquid is added after the endosperm has been reduced to a satisfactory state of division, that is to say, to pieces ranging in weight from one gram downwards, and of any shape. The quantity of water added will run from an amount equal to one-quarter by weight of the endosperm used, up to any convenient amount, usually not exceeding one-half the weight of the endosperm used.

The endosperm, with its added liquid, is squeezed or subjected to pressure, either by hand, or in any kind of press, moisture expeller, or in any other mechanical contrivance, or by rolling, or by a combination of rolling and abrasion, or by any kind of screw action, or by action similar to that of a mortar and pestle, with the object of separating from the solid constituents of the endosperm the liquids originally contained therein, in the form of emulsions or otherwise, in addition to the liquid added to the endosperm. Instead of using mechanical means for extracting the liquid portions of the endosperm from the solid portion, they may be extracted with carbon tetrachloride, petroleum ether, chloroform, or any other fat solvent.

The steps thus far described will result in two products,—one comprising the solid constituents of the endosperm, plus such of the liquids as may resist separation therefrom, and the other the residual liquid. The present application deals primarily with the residual liquid. This product is composed of water, coconut oil, sugar in solution, albumenoid and other proteins, and possibly, traces of other constituents, all in an emulsified state. This emulsified product I call "coconut milk". This coconut milk is concentrated by means of evaporation, either in the open, or under reduced atmospheric pressure, as in a vacuum pan, or by separation on the principle of an ordinary centrifuge, or cream separator; or it is coagulated or flocculated by heat or chemicals, until it is wholly anhydrous, or within any desired percentage of being so. During the processes of concentration described herein, the temperature of the product must not exceed 80° centigrade. This is essential.

The resulting product, which is concentrated coconut milk, consists of approximately 70% of pure coconut oil, 12% of proteid or albumenous matter, 12% of sugar, and 6% of water. The oil contained in the concentrated coconut milk, made as described above, by reason of the careful method of manufacture, is absolutely odorless, colorless, water-white, neutral, and free from rancidity or fatty acids. Such an oil, as far as I am aware, has never been produced in commercial quantity.

The oil is extracted from the concentrated coconut milk by means of raising the product above the melting point of the coconut fat, then lowering it below the solidification point of the coconut oil, and repeating these steps once or twice, coupled with gentle agitation, if necessary, when the oil will separate out of the concentrated coconut milk, and will float freely on the surface whence it can be easily poured off.

Owing to the purity of the product, the oil is especially adapted for medicinal and toilet preparations, and for the manufacture of edibles, such as butter substitute, etc., for which a pure neutral oil is highly desirable.

I claim:

1. The herein described process of producing a neutral coconut oil which consists in reducing coconut endosperm to a comminuted state in the presence of water, maintaining the comminuted mass at normal temperature, extracting the liquid content, concentrating the liquid thus extracted, and subsequently separating out the oil from the concentrated liquid by raising the latter to a temperature above the melting point of coconut fat, lowering it below the solidification temperature of coconut oil, and pouring off the separated oil.

2. The herein described process of producing a neutral coconut oil which consists in reducing coconut endosperm to a comminuted state in the presence of water, maintaining the comminuted mass at normal temperature, extracting the liquid content, concentrating the liquid thus extracted, subsequently separating out the oil from the concentrated liquid by raising the latter to a temperature above the melting point of coconut fat, lowering it below the solidification temperature of coconut oil, repeating the raising and lowering of the temperature accompanied with gentle agitation, and pouring off the separated oil.

3. The herein described process of producing a neutral coconut oil which consists in reducing coconut endosperm to a comminuted state in the presence of water, maintaining the comminuted mass at normal temperature, extracting the liquid content, concentrating the liquid thus extracted by evaporation under heat not to exceed 80° centigrade, subsequently separating out the oil from the concentrated liquid by raising the latter to a temperature above the melting point of coconut fat, lowering it below the solidification temperature of coconut oil, repeating the raising and lowering of the temperature accompanied with gentle agitation, and pouring off the separated oil.

WILLIAM STANLEY COOKSON.